J. W. DREW.
PUMP VALVE.
APPLICATION FILED APR. 10, 1920.
1,376,863.
Patented May 3, 1921.
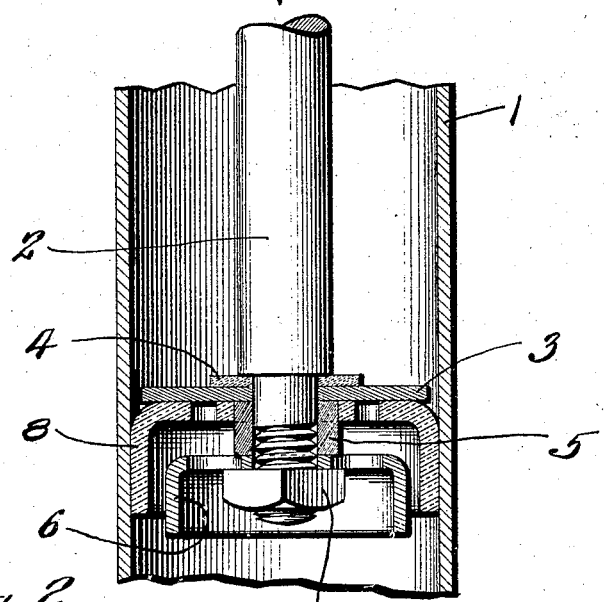
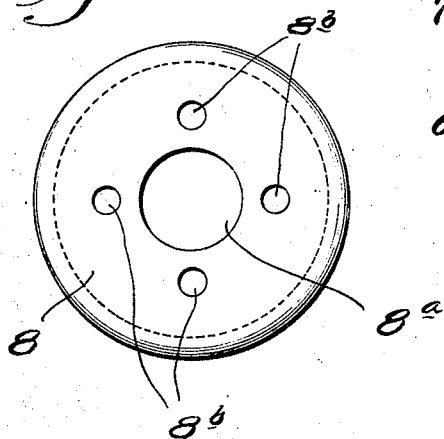
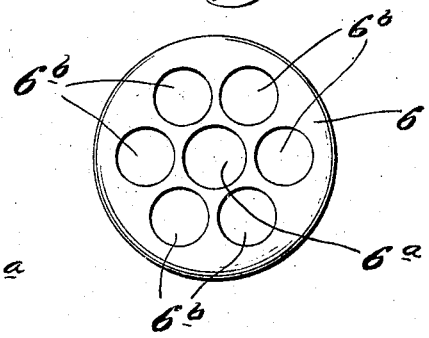
Inventor
John W. Drew

UNITED STATES PATENT OFFICE.

JOHN W. DREW, OF ST. LOUIS, MISSOURI, ASSIGNOR TO MOON BROTHERS MANUFACTURING COMPANY, OF ST. LOUIS, MISSOURI, A CORPORATION OF MISSOURI.

PUMP-VALVE.

1,376,863.  Specification of Letters Patent.  Patented May 3, 1921.

Application filed April 10, 1920. Serial No. 372,738.

*To all whom it may concern:*

Be it known that I, JOHN W. DREW, a citizen of the United States, residing at St. Louis, Missouri, have invented a certain new and useful Improvement in Pump-Valves, of which the following is a full, clear, and exact description, such as will enable others skilled in the art to which it appertains to make and use the same, reference being had to the accompanying drawings, forming part of this specification, in which—

Figure 1 is a vertical sectional view through the portion of a pump cylinder showing my improved valve in position therein.

Fig. 2 is a plan view of the leather cup showing the arrangement of the perforations therein.

Fig. 3 is a plan view of a metallic cup shaped washer having perforations which coöperate with the perforations in said leather cup.

This invention relates to a new and useful improvement in valves for air pumps, being designed particularly for air pumps of the type employed for the inflation of bicycle and automobile tires and which are usually operated by hand.

The object of the present invention is to simplify the construction of pumps of this class, having in mind cheapness of manufacture and efficiency in operation.

In the drawings, 1 indicates the cylinder of the pump, 2 the piston rod, which is reduced at its lower end to form a shoulder against which is seated a solid washer 3, said washer being preferably made airtight by means of a paper or other flexible gasket 4. A sleeve 5 is mounted upon the reduced end of the piston rod and below said washer 3 and is held in position by a perforated cup-shaped metallic washer 6, this metallic washer and sleeve coöperating in conjunction with a nut 7 threaded on the lower end of the piston rod to hold the solid washer 3 against the shoulder on the piston rod.

The metallic washer 6 is provided with a central opening $6^a$, through which the threaded lower end of the piston rod passes, and perforations or openings $6^b$, which serve as air passages during the suction stroke of the piston. The leather cup 8 is formed with a central opening $8^a$ which permits the leather cup to be mounted on sleeve 5 and with perforations or openings $8^b$ arranged to coöperate during the suction stroke of the piston with the perforations $6^b$ in washer 6. The leather cup 8 is freely mounted on sleeve 5, its movement being limited by the metallic washer 3, against which it seats itself in its compression stroke, and the perforated metallic washer 6, against which it seats itself in its suction stroke.

In the suction stroke, the leather cup 8 is seated against the metallic washer 6 so that the openings $8^b$ will coöperate with the openings or perforations $6^b$ thereby forming air passages through which the air can flow freely into the compression chamber of the cylinder. The disposition of the openings $6^b$ on washer 6 with respect to the openings $8^b$ on leather cup 8 is such that during the suction stroke of the piston, one or more of the openings $8^b$ in the leather cup will always register or coöperate with openings $6^b$ in the washer 6. This particular arrangement of perforations or openings in washer 6 and leather cup 8 also permits any accidental rotative movement of the leather cup on its axis without disturbing or affecting the operation of the valve.

By forming the washer 6 cup-shaped, the sharp edges which would cut the leather cup are eliminated, and the life and usefulness of said leather cup is considerably increased.

What I claim is:

1. A piston valve for pumps comprising a shouldered piston rod, a solid washer held against the shoulder of said piston rod, a sleeve for holding said solid washer in position, a perforated leather cup movably mounted on said sleeve, a perforated metallic washer forming a support for said cup in its suction movement, and a nut arranged on said piston rod for holding said parts in position.

2. A piston valve for pumps comprising a piston rod, a solid washer fixed to said piston rod, a sleeve on said piston rod adjacent to said washer, a perforated washer spaced from said solid washer by said sleeve, means on said piston rod for holding said parts in position, and a flexible cup movably mounted on said sleeve and having perforations adapted to coöperate with the perforations on said perforated washer.

In testimony whereof I hereunto affix my signature this 6th day of April, 1920.

JOHN W. DREW.